(12) United States Patent
Dunbar (10) Patent No.: US 8,619,583 B2
(45) Date of Patent: Dec. 31, 2013

(54) INGRESS NODE CONTROLLED PATH IMPAIRMENT PROTOCOL (75) Inventor: Linda Dunbar, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 334 days.

(21) Appl. No.: 12/984,344

(22) Filed: Jan. 4, 2011

(65) Prior Publication Data
US 2011/0164501 A1 Jul. 7, 2011

Related U.S. Application Data (60) Provisional application No. 61/292,587, filed on Jan. 6, 2010.

(51) Int. Cl.
H04J 1/16 (2006.01)

(52) U.S. Cl.
USPC ........ 370/236.2; 370/229; 370/230; 370/236; 370/241; 370/244; 370/254; 370/337; 370/395; 370/400; 370/442; 370/468; 370/480

(58) Field of Classification Search
USPC ......... 370/254, 395, 337, 442, 480, 229–241, 370/244, 400, 468
See application file for complete search history.

(56) References Cited

U.S. PATENT DOCUMENTS

| 6,021,129 | A* | 2/2000 | Martin et al. | 370/395.72 |
|---|---|---|---|---|
| 7,940,695 | B1* | 5/2011 | Bahadur et al. | 370/254 |
| 2011/0032821 | A1* | 2/2011 | Morrill et al. | 370/230 |
| 2011/0170426 | A1* | 7/2011 | Kompella et al. | 370/242 |

OTHER PUBLICATIONS

ITU-T Y.1731 "OAM functions and mechanisms for Ethernet based networks", Feb. 2008.*
RFC-4379, "Detecting Multi-Protocol Label Switched (MPLS) Data Plane Failures", Feb. 2006.*
ITU-T Y.1711 "Operation & Maintenance mechanism for MPLS networks", Feb. 2004.*
RFC-4783 "GMPLS—Communication of Alarm Information", Dec. 2006. RFC-4090, "Fast Reroute Extensions to RSVP-TE for LSP Tunnels", May 2005. IETF-Draft "IS-IS protocol extensions for Path Computation Element (PCE) Discovery", May 2007.*
ITU-1731, "OAM functions and mechanisms for Ethernet based networks", (Feb. 2008).*
RFC5559, "Pre-Congestion Notification (PCN) Architecture", (Jun. 2009). Aggarwal, R. et al., "BFD for MPLS LSPs", "draft-ietf-bfd-mpls-07.txt", (Jun. 2008).*

(Continued)

Primary Examiner — Un C Cho
Assistant Examiner — Oussama Roudani
(74) Attorney, Agent, or Firm — Conley Rose, P.C.; Grant Rodolph; Rayhao Chung (57) ABSTRACT An apparatus comprising a node configured to transmit operation, administration, and maintenance (OAM) connectivity frames, wherein the node adds an impairment notification indication to some, but not all of OAM connectivity frames transmitted by the node, wherein the impairment notification indication indicates the node's desire to receive notification of an impairment condition along the path. A network component comprising a receiver unit configured to receive multiprotocol label switching (MPLS) Ping frames, a circuit logic configured to add a downstream link impairment indication to responses to the MPLS Ping frames, wherein the downstream link impairment indication comprises a type and a severity level for a path impairment condition, and a transmitter unit configured to transmit the responses to the transmitted MPLS Ping frames.

6 Claims, 6 Drawing Sheets

(56) References Cited

OTHER PUBLICATIONS

ITU-1711, "Operation & Maintenance mechanism for MPLS networks", Feb. 2004. RFC4379, "Detecting Multi-Protocol Label Switched (MPLS) Data Plane Failures", Feb. 2006.*

RFC4783, "GMPLS—Communication of Alarm Information", Dec. 2006.*

Ramakrishnan, K., et al., "The Addition of Explicit Congestion Notification (ECN) to IP," RFC 3168, Sep. 2001, 64 pages.

Kuzamanovic, A., et al., "Adding Explicit Congestion Notification (ECN) Capability to TCP's SYN/ACK Packets," RFC 5562, Jun. 2009, 34 pages.

Davie, B., et al., "Explicit Congestion Marking in MPLS," RFC 5129, Jan. 2008, 20 pages.

Kompella, K., et al., "Detecting Multi-Protocol Label Switched (MPLS) Data Plane Failures," RFC 4379, Feb. 2006, 51 pages.

Dunbar, L., et al., "Detecting MPLS Path Impairment Using MPLS-Ping," draft-dunbar-so-mpls-detect-impair-mplsping-02.txt., Aug. 13, 2010, 10 pages.

Bahadur, N., et al., "Mechanism for Performing LSP-Ping over MPLS Tunnels," draft-ietf-mpls-lsp-ping-enhanced-dsmap-04, Oct. 23, 2009, 22 pages.

Aggarwal, R., et al., "BFD for MPLS LSPs," draft-ietf-bfd-mpls-07.txt, Jun. 20, 2008, 13 pages.

"Virtual Bridged Local Area Networks—Amendment: Congestion Notification," IEEE P802.1Qau/D2.4, Draft Standard for Local and Metropolitan Area Networks, Oct. 28, 2009, 119 pages.

* cited by examiner

FIG. 2

| Type | Length | Value |
|---|---|---|
| Optional Routable IPV4 or IPV6 address of source node |||

FIG. 3

| Path Condition Subtype | Length | Impairment Value |
|---|---|---|
| BFD or CCM control header field<br>(All the head fields until my discriminator, your discriminator) |||

FIG. 5

| Type | Length | ImpairmentType | Severity Level |
|---|---|---|---|

FIG. 6

| MTU | Address Type | DS flags |
|---|---|---|
| Downstream IP Address (4 or 16 octets) |||
| Downstream Interface Address (4 or 16 octets) |||
| Multipath Type | Depth Limit | Multipath Length |
| Multipath Information |||
| Downstream Label | Protocol | |
| ⋮ | ⋮ | ⋮ |
| Downstream Label | Protocol | |

INGRESS NODE CONTROLLED PATH IMPAIRMENT PROTOCOL

CROSS-REFERENCE TO RELATED APPLICATIONS

The present application claims the benefit of U.S. Provisional Patent Application No. 61/292,587, filed Jan. 6, 2010 by Linda Dunbar, and entitled "Ingress Node Controlled Path Impairment Protocol," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames from one node to another node across the network without using pre-configured routes on the intermediate nodes. Other networks may forward the data frames from one node to another node across the network along pre-configured or pre-established paths. In some networks, the nodes may create Ethernet-Local Area Network (E-LAN) services, where traffic that corresponds to different services may be transported along different sub-networks, e.g. by different subsets of nodes. For example, the E-LAN services may comprise Institute of Electrical and Electronics Engineers (IEEE) 802.1aq network services or Virtual Private LAN Services (VPLS).

For some premium data services, source nodes (e.g., edge nodes such as a Customer Edge node, a Service Provider Ingress node, a multiprotocol label switching (MPLS) label switched path (LSP) source node, or a provider backbone bridging (PBB)-traffic engineering (TE) traffic engineered service instance (TESI) source node) may have multiple paths, which may be purchased from different service providers, to their corresponding destination nodes. For such premium services, the optimal path from each service provider is desired to achieve the best delivery of their traffic. However, condition changes (e.g., due to congestion on transit nodes, microwave transport bandwidth being impaired due to weather, or downstream hop port changes) along the pre-established path (e.g., an LSP, a PBB-TE path, or other transport path) may necessitate changes over time.

Various techniques exist to signal path impairment; however, the known techniques are either inefficient or otherwise impractical. For example, resource reservation protocol (RSVP)-TE enables individual links to advertise its available bandwidth to all the nodes in the routing domain, but RSVP-TE is not possible if the path between the source node and the destination node traverse multiple routing domains. As another example, Internet Protocol (IP) Explicit Congestion Notification (ECN) (Internet Engineering Task Force (IETF) Request for Comments (RFC) 3168) and Transmission Control Protocol (TCP) ECN (RFC 5562) describe randomly marking on data frames in transit when congestion occurs in the middle of the network. However, some transit nodes do not detect IP frames and some egress nodes (e.g., MPLS LSPs) do not terminate all of the IP frames. Also, MPLS ECN (RFC 5129) specifies a mechanism for transit nodes to mark EXP bits when congestion happens. However, many deployed MPLS networks already use EXP bits to mark priority, and thus the ECN (RFC 5129) mechanism cannot be implemented in those networks.

One issue with ECN (e.g., IP ECN, TCP ECN, and MPLS ECN) is that the congestion marking does not occur until congestion happens. Accordingly, when a transit link bandwidth is reduced (e.g., when a microwave transport link's bandwidth is reduced due to weather), the queue on the transit node can quickly build up. Even if the ECN (IP/TCP/MPLS ECN) scheme is used, by the time the egress node recognizes the congestion and notifies the source node, the queue on the transit node may already overflow resulting in lost packets. IEEE 802.1au specifies a sophisticated mechanism and algorithm to enable an intermediate node to indicate the congestion level to the source node. However, the quantized feedback algorithm is complicated and the source node may not need the quantity and type of information provided.

Another issue with ECN and IEEE 802.1au is that source node may not even be able to do anything with the congestion notification. For example, the source node may only have one link out to the destination or may not have sufficient capability to switch traffic. In these circumstances, the source nodes do not need to know the congestion condition in the middle of the network. Therefore, the marking operations performed by intermediate nodes upon congestion or impairment are wasted.

SUMMARY

In one embodiment, the disclosure includes an apparatus comprising a node configured to transmit operation, administration, and maintenance (OAM) connectivity frames, wherein the node adds an impairment notification indication to some, but not all of OAM connectivity frames transmitted by the node, wherein the impairment notification indication indicates the node's desire to receive notification of an impairment condition along the path.

In another embodiment, the disclosure includes a network component comprising a receiver unit configured to receive multiprotocol label switching (MPLS) Ping frames, a circuit logic configured to add a downstream link impairment indication to responses to the MPLS Ping frames, wherein the downstream link impairment indication comprises a type and a severity level for a path impairment condition, and a transmitter unit configured to transmit the responses to the transmitted MPLS Ping frames.

In a third embodiment, the disclosure includes a method comprising using a reserved bit of DS flags in an Echo Request for the source node to indicate if it desires to receive the impairment condition of the downstream link on a transit label switched router, wherein a C bit allows a source label switched router (LSR) to indicate if it desires to have the link impairment condition reported by transit LSR in the Echo Reply.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any quantity of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are network embodiments that provide a path impairment notification only to the source nodes that are interested in getting the information such that source nodes that do not care about the path impairment along the path do not receive the path impairment notifications. As such, the intermediate nodes only mark on the paths associated with source nodes that are interested in knowing the impairment condition. The disclosed path impairment notification scheme may be implemented, for example, with connection oriented networks (e.g., MPLS LSP or PBB TE TESI), where paths are established ahead of time. If conditions along a pre-established path change over time (e.g., due to microwave transport bandwidth being changed due to poor weather or due to link failure), certain source nodes may desire to be notified of such condition changes. For example, at least some source nodes that are notified of path condition changes are able to perform operations such as switching traffic to alternative paths or adjusting admission control. The implementation of the path impairment notification scheme is optional for source nodes in a connection oriented network. In at least some embodiments, a source node may initiate use of the path impairment notification scheme by adding a path impairment notification indication to transmitted management packets such as operation, administration, and maintenance (OAM) connectivity frames or MPLS-Ping TLV frames. Similarly, a source node may avoid use of the path impairment notification scheme by not adding the path impairment notification indication to management packets. In this manner, the overhead of implementing the path impairment notification scheme is appropriately limited to providing path impairment information to the source nodes that want to receive this type of information.

One environment for utilizing the path impairment notification scheme disclosed herein is in Mobile Backhaul networks, where microwave transport is widely deployed. Most microwave transport nodes adjust their bandwidth based on the weather. Even though RSVP-TE allows individual links to advertise their available bandwidth in the routing domain, end-to-end bandwidth change may not be possible in some Mobile Backhaul environments because there may be multiple routing domains from the base stations to the main switching office (MSO). If source nodes (e.g., long term evolution's (LTE's) evolved base transceiver station (eNodeB) or MSO's radio network controller (RNC)) are aware of the bandwidth change, they can perform operations such as adjusting services, requesting other base stations to accept new calls, or triggering a new performance monitoring scheme to track the condition more closely.

Another environment for utilizing the path impairment notification scheme disclosed herein is in MPLS-ENC networks, where source label switched routers (LSRs) may want to be aware of the congestion along an LSP path so that proper actions can be taken. MPLS-ECN (RFC 5129) specifies a mechanism for transit nodes to mark experimental (EXP) bits when congestion happens. However, many deployed MPLS networks already use EXP bits to mark packet priorities, making MPLS-ECN (RFC 5129) mechanism unusable for the purpose of LSP change indication.

Another environment for utilizing the path impairment notification scheme disclosed herein is to enable source LSRs to be aware of significant performance degradation on the downstream links along the LSP path. The performance degradation can be due to increased latency and/or increased delay variation. Those performance degradations may be induced by the physical layer protection scheme (e.g., link switching from active side of the ring to protect side of the ring), or it may be induced by transmission media degradation.

Another environment for utilizing the path impairment notification scheme disclosed herein is enable source LSRs to be aware of transport media changes on the downstream links along the LSP path. For example, the link can be a fiber protected by microwave, and the source router may be carrying an application that cannot use microwave due to security concerns.

Figure 1:
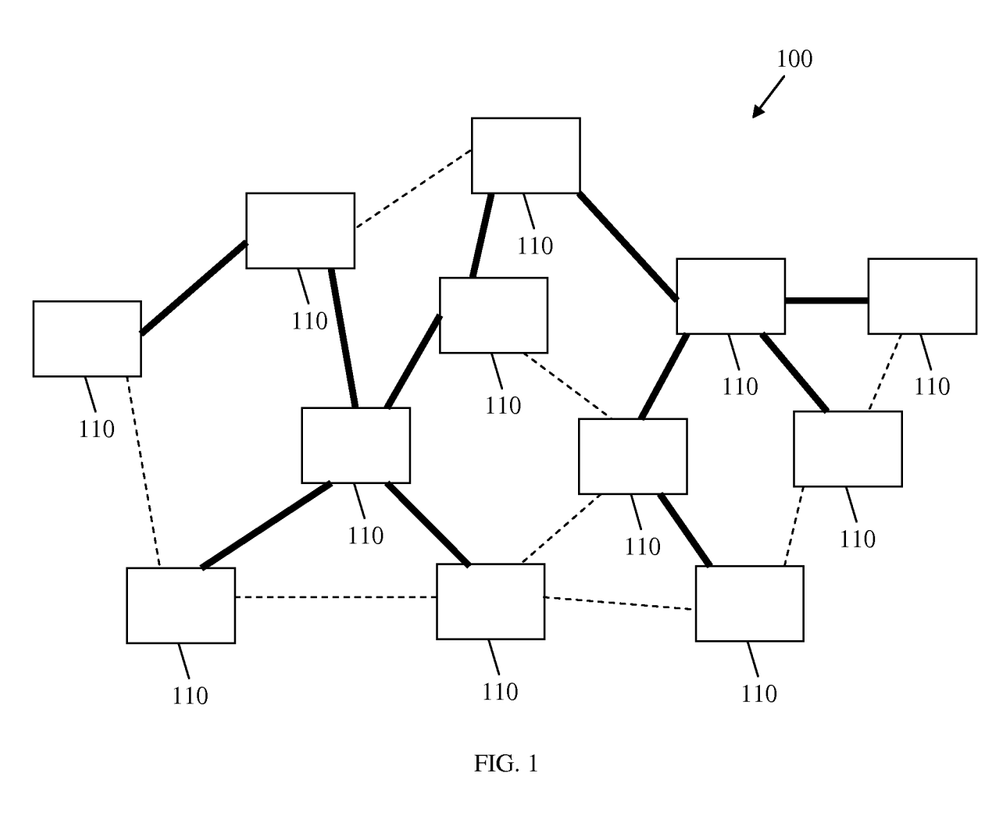
FIG. 1 is a schematic diagram of an embodiment of a service based network.

FIG. 1 illustrates one embodiment of a service based network 100. The service based network 100 may comprise a plurality of nodes 110, which may comprise switches, routers, bridges, or combinations thereof. The nodes 110 may each comprise a plurality of logical and/or physical ports and may be coupled to each other via the ports and a plurality of network links (indicated by the dashed lines). The service based network 100 may be any network that establishes services between the nodes 110. The establishment and utilization of such services may result in different nodes 110 operating at different times as source nodes, intermediate nodes, and destination nodes in the service based network 100.

For example, a service may be established between a subset of the nodes 110 (indicated by the bold solid lines). With the service established, at least one of the nodes 110 may operate as a source node that initializes use of the disclosed path impairment notification scheme by adding a path impairment notification indication to a management packet (e.g., an OAM connectivity frame or a MPLS-Ping TLV frame). In at least some embodiments, the path impairment notification indication comprises a type-length-value (TLV) sub-field with a multi-bit impairment value, which may the source node's desire to receive information regarding the impairment type and/or severity level. The path impairment notification indication also may comprise an address for the source node to facilitate sending path impairment notification responses to back to the source node. Alternatively, the request can be a standalone notification request.

Any intermediate nodes that encounter path impairments (e.g., a congested port, a reduced bandwidth, or an altered port) are able to provide impairment notifications back to the source node using the path impairment notification indication provided with the management packet. The impairment notifications may include the impairment type and/or severity level, and may be set by a network operator. Alternatively, the response can be a standalone notification request. Upon receipt of any responses, the source node is able to decode impairment type information and perform operations such as: obtaining additional information regarding an impaired path indicated by the response, changing communication paths being used to avoid an impaired path indicated by the response, and reducing (but not necessarily eliminating) a data load for an impaired path indicated by the response.

Figure 2:
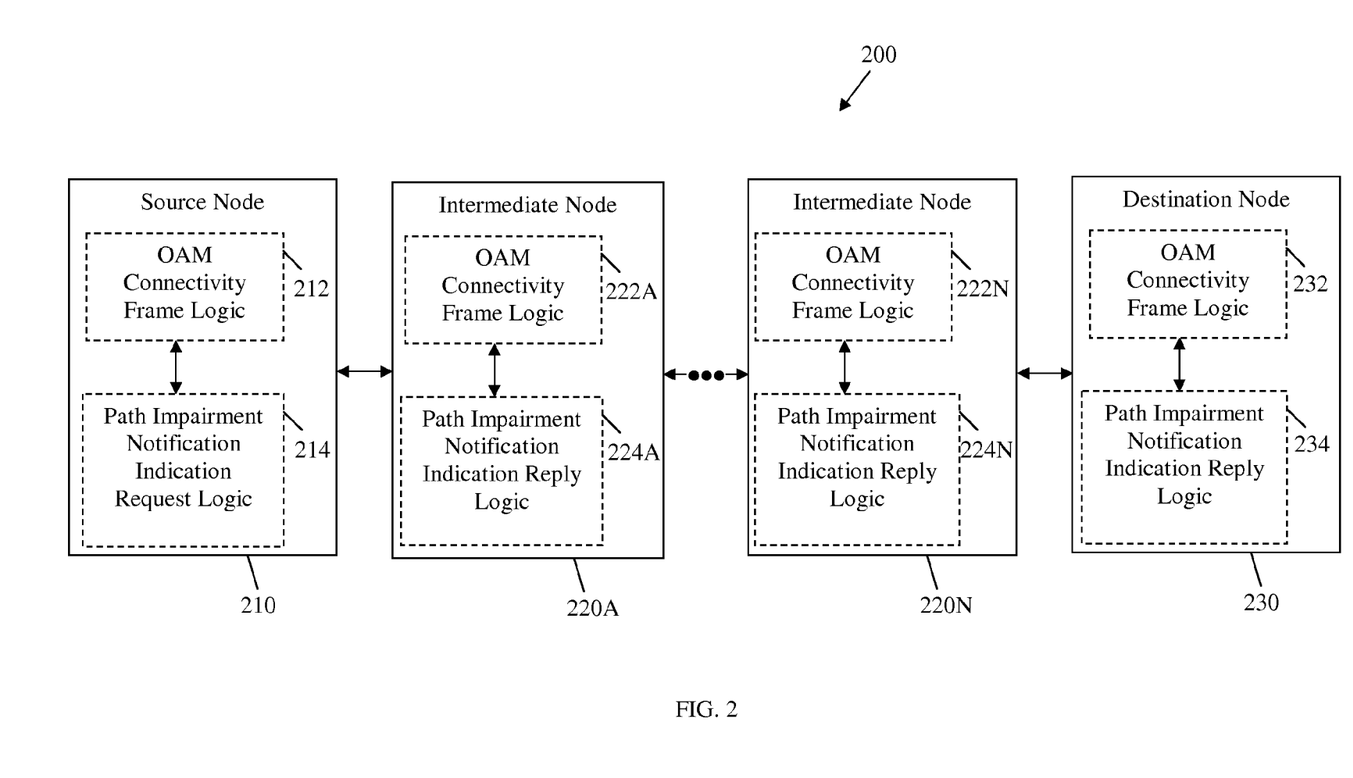
FIG. 2 is a schematic diagram of a communication system that utilizes path impairment notification indications.

FIG. 2 is a schematic diagram of a communication system 200 that utilizes path impairment notification indications. The various nodes of communication system 200 may correspond to nodes 110 of the service based network 100 or nodes of another network. As shown in FIG. 2, the communication system 200 comprises a source node 210 that communicates with a destination node 230 via one or more intermediate nodes 220A-220N. The source node 210 comprises OAM connectivity frame logic 212 configured to periodically transmit OAM connectivity frames toward the destination node 230. The source node 210 also comprises path impairment notification indication request logic 214 configured to selectively add a path impairment notification indication to OAM connectivity frames transmitted by the source node 210. The path impairment notification indication request logic 214 also enables the source node 210 to decode path impairment responses based on the path impairment notification indication and to perform appropriate operations including, but not limited to, obtaining additional information regarding an impaired path indicated by the response, changing a communication path being used to avoid an impaired path indicated by the response and/or reducing a data load for an impaired path indicated by the response.

The path impairment responses are generated by any of the intermediate nodes 220A-220N, which receive an OAM connectivity frame having the path impairment notification indication. The intermediate nodes 220A-220N respectively comprise OAM connectivity frame logic 222A-222N and path impairment notification indication reply logic 224A-224N to enable the intermediate nodes 220A-220N to reply to OAM connectivity frames having the path impairment notification indication. In some embodiments, the destination node 230 also comprises OAM connectivity frame logic 232 and path impairment notification indication reply logic 234 that enables the destination node 230 to reply to OAM connectivity frames having the path impairment notification indication. In order to generate the reply, the path impairment notification indication reply logic of FIG. 2 (logic 224A-224N and 234) also detects path impairments or receives path impairment information from a suitable detector.

As an example of the operations of FIG. 2, when periodic OAM connectivity frames (e.g., bidirectional forwarding detection (BFD) for MPLS or continuity check message (CCM) for Ethernet) is enabled between a pair of nodes (e.g., a source LSR/PE and a destination/LSR/PE), the frequency is on a fixed interval (usually in the magnitude of milliseconds). Since the connectivity frames (CCM and MPLS-BFD) are intended to traverse along a pre-established path (MPLS LSP or PBB-TE), a transit (intermediate) node has the information on the port to the path's downstream node and is aware of the downstream link status, including impairment status, such as bandwidth being reduced, a port being altered, or a port being congested. Therefore, periodic OAM connectivity frames (MPLS BFD, Ethernet CCM) are a suitable choice for implementing a path impairment notification scheme as disclosed herein.

The path impairment notification indication described herein corresponds to a path impairment notification control field, which can be added by the source node 210 to the OAM connectivity frame. In at least some embodiments, the path impairment notification control field serves the following purposes: 1) for the source node to indicate that it desires path impairment information; and 2) to indicate the source node address for the transit node to forward path impairment notification. In such embodiments, the path impairment notification control field has the format shown in FIG. 3.

If a source node of a path cannot do anything when the path is impaired, then the source node does not have to include this optional path impairment notification control field in the OAM connectivity frame (BFD or CCM). When the path impairment notification control field is not present in the OAM connectivity frame (BFD or CCM), the transit LSR does not need to mark the path condition change indication.

If the source node can re-route the traffic to an alternative path when the normal path is impaired or altered, the source node should include the optional path impairment notification control field in the BFD/CCM connectivity frame. If this path impairment notification control field is included, the transit node can do the following when downstream link impairment (e.g., congestion or bandwidth reduction) is experienced: 1) mark on the path impairment notification control field to specify the condition of the downstream link; and/or 2) send a path condition impairment notification (a reply) back to the source LSR.

Figure 3:
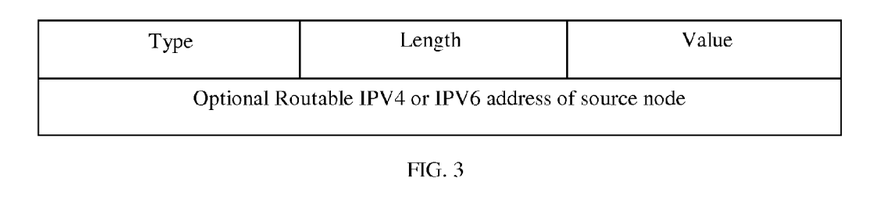
FIG. 3 is a schematic diagram of an embodiment of a path impairment notification control field.

The ImpairmentValue sub-field of the path impairment notification control field can take one of the values shown in Table 1:

TABLE 1

| Value | Meaning |
| --- | --- |
| 1 | Port towards downstream LSR is congested |
| 2 | Bandwidth of the link towards downstream LSR is reduced |
| 3 | Port towards downstream LSR has been altered |

The optional Routable IP (or Ethernet) address in the path impairment notification control field is to enable the transit node to send a path condition impairment notification back to the source node. Since BFD/CCM control frames between a pair of nodes are exchanged very frequently, it may not necessary for the transit node to send the path condition impairment notification every time a BFD/CCM control frame is received. In order to minimize the amount of work performed by the transit node, the source node controls whether it needs path impairment notifications from a transit node when the transit node experiences downstream link impairment. When the Routable IP (Ethernet) address is included in the path impairment notification control field portion of a BFD/CCM control frame, the transit node will send back a path condition impairment notification to the source node when impairment is encountered. Upon receiving the path condition impairment notification, the source LSR can do various actions including, but not limited to, triggering more sophisticated protocols to the transit node to find out more detailed information (e.g., Quantized Feedback defined by IEEE 802.1au), re-adjusting load balance among the multiple paths from the source LSR to the destination LSR, activating a protection path to take over the traffic, or reducing admission rate (in the case of LTE eNodeB).

When a transit node receives a BFD/CCM frame and its downstream link is impaired or altered, the transit node may do the following: 1) if the BFD/CCM does not include the path impairment notification control field, simply forward the BFD/CCM to the next hop; or 2) if the BFD/CCM does include the path impairment notification control field, then set the ImpairmentValue field (if needed) and forward the BFD/CCM to the next hop. If Routable IP/Ethernet address is included in the path impairment notification control field, the transit node may construct a path condition impairment notification message and send it to the source node.

Figure 4:
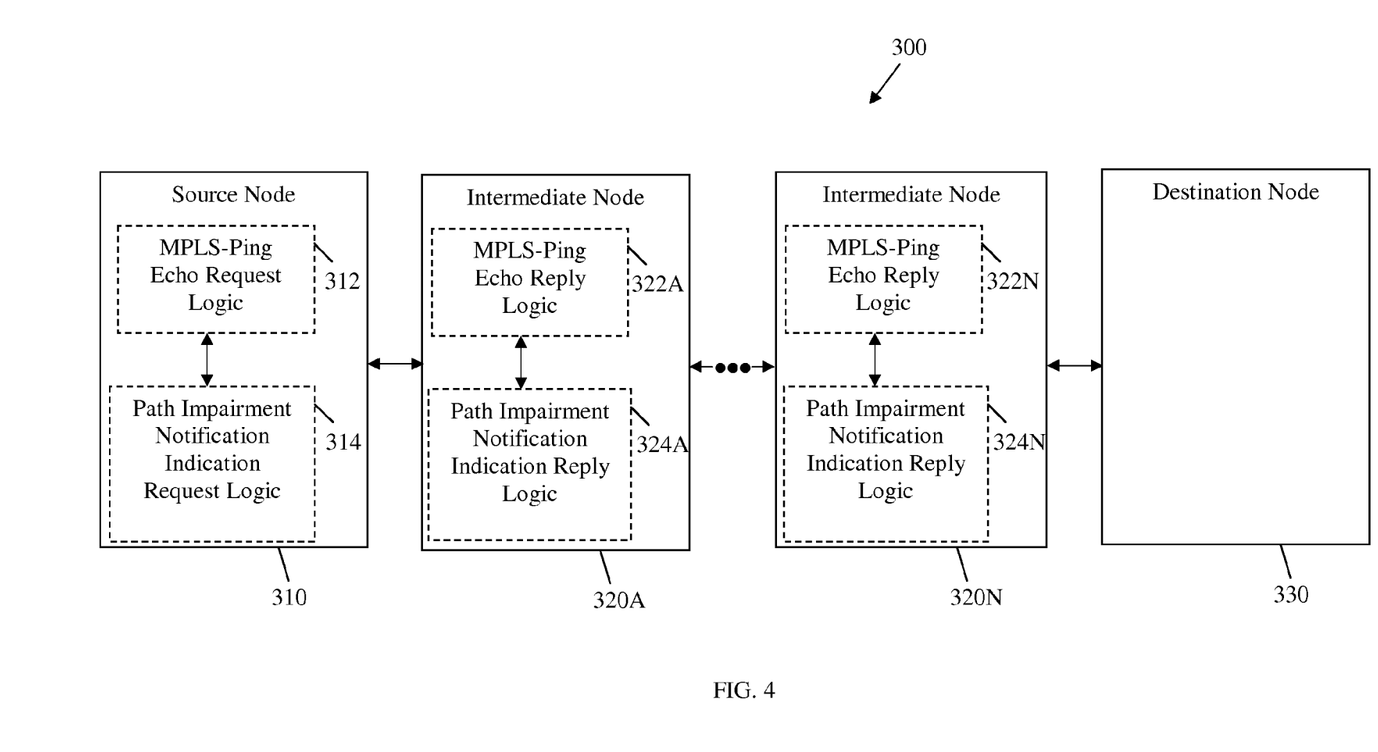
FIG. 4 is a schematic diagram of another communication system that utilizes path impairment notification indications.

FIG. 4 is a schematic diagram of another communication system 300 that utilizes path impairment notification indications. The various nodes of communication system 300 may correspond to nodes 110 of the service based network 100 or nodes of another network. As shown in FIG. 4, the communication system 300 comprises a source node 310 that communicates with a destination node 330 via one or more intermediate nodes 320A-320N. The source node 310 comprises MPLS-Ping echo request logic 312 configured to transmit MPLS-Ping TLV frames toward the destination node 330. The source node 310 also comprises path impairment notification indication request logic 314 configured to selectively add a path impairment notification indication to MPLS-Ping TLV frames transmitted by the source node 310. The path impairment notification indication request logic 314 also enables the source node 310 to decode path impairment responses based on the path impairment notification indication and to perform appropriate operations including, but not limited to, obtaining additional information regarding an impaired path indicated by the response, changing a communication path being used to avoid an impaired path indicated by the response and/or reducing a data load for an impaired path indicated by the response.

The path impairment responses are generated by any of the intermediate nodes 320A-320N, which receive a MPLS-Ping TLV frame having the path impairment notification indication. The intermediate nodes 320A-320N respectively comprise MPLS-Ping echo reply logic 322A-322N and path impairment notification indication reply logic 324A-324N to enable the intermediate nodes 320A-320N to reply to MPLS-Ping TLV frames having the path impairment notification indication. In order to generate the reply, the path impairment notification indication reply logic of FIG. 4 (logic 324A-324N) also detects path impairments or receives path impairment information from a suitable detector.

The path impairment notification indication described for FIG. 4 corresponds to a path impairment notification control field, which can be added by the source node 310 to a MPLS-Ping echo request. In at least some embodiments, transit nodes that receive a MPLS-Ping echo request are able to add a new value to indicate that the message is for path condition impairment notification in responding to BFD as shown in Table 2.

TABLE 2

| Value | Meaning |
| --- | --- |
| 1 | MPLS echo request [RFC 4379] |
| 2 | MPLS echo reply [RFC 4379] |
| 3 | Path Condition Impairment Notification in responding to BFD |

In at least some embodiments, the path impairment notification control field described herein corresponds to a new "Downstream Path Condition" sub-TLV to reflect the condition of the downstream link. When used as a standalone path condition impairment notification (which is activated upon receiving a BFD control frame with the optional Routable IP Address included in the path impairment notification control field), the Downstream Path Condition sub-TLV will be the only sub-TLV in the Downstream Detailed Map (used in the MPLS-Ping-Enhanced protocol).

Figure 5:
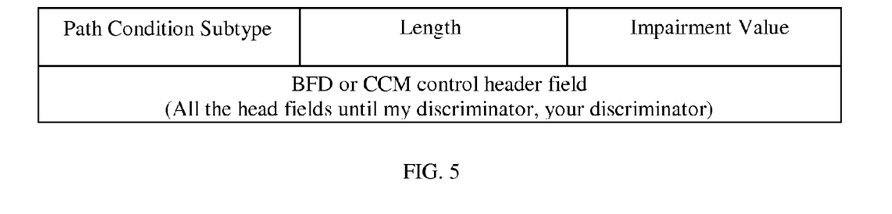
FIG. 5 is a schematic diagram of an embodiment of downstream path condition impairment sub-type-length-value (TLV).

When the downstream path condition is included as a sub-type, the Return Code of the echo response message has to be set to "See downstream detailed mapping (DDM) TLV for Return Code and Return SubCode." Accordingly, the Downstream Path Condition Impairment sub-TLV should have the format shown in FIG. 5 (the Impairment Value is the same the value used in the BFD control frame).

Upon receiving a path condition impairment notification (either via the message from transit node or via the marking on the OAM connectivity frame, the source node can perform various possible actions such as: 1) sending more sophisticated inquiry message to the transit node to find out what exactly went wrong (this scheme could be proprietary or a IEEE 802.1au like scheme); 2) triggering performance monitor scheme, which may or may not be proprietary, to measure the quality of the path; 3) re-adjusting load balance among the multiple paths from the source node to the destination node; 4) activating the protection path to take over the traffic; 5) reducing admission rate (in the case of LTE eNodeB); and/or 6) if the source node is the service provider edge (PE) node (i.e. user network interface (UNI)-N, PE), sending notification to the client (UNI-C node).

The MPLS-Ping protocol specifies that the replying router for MPLS Ping should include one Downstream Mapping for each interface, over which the forwarding equivalence class (FEC) could be forwarded, in the Echo Reply. Further, the MPLS-Ping-Enhanced protocol introduces three types of sub-TLVs to the Downstream Detailed Mapping, Multipath data, Label stack, and FEC Stack change.

In accordance with at least some embodiments, the new sub-TLV "Downstream Link Condition" is added to the MPLS-Ping protocol to indicate the condition of the downstream link of the corresponding interface. The "Downstream Path Condition" could be used to indicate a bandwidth being reduced, the interface being congested, etc. The Downstream Path Condition sub-TLV has the format shown in FIG. 6.

Figure 6:
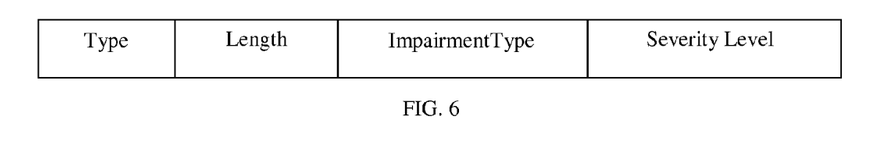
FIG. 6 is a schematic diagram of an embodiment of downstream path condition sub-TLV.

The ImpairmentType field of the Downstream Path Condition sub-TLV can take one of the values shown in Table 3.

TABLE 3

| Value | Meaning |
| --- | --- |
| 1 | Port towards downstream LSR is congested |
| 2 | Bandwidth of the link towards downstream LSR is reduced |
| 3 | Performance of the link towards downstream LSR is reduced |
| 4 | Transport media of the link towards downstream LSR has been changed |

Meanwhile, the "severity level" field of the Downstream Path Condition sub-TLV is a value indicating the severity of the impairment. In some embodiments, a network operator can set the severity level for anticipated conditions and configure the proper actions at the source node upon receiving the Echo Reply. For example, severity level "0" can represent full bandwidth, severity level "1" represents the next bandwidth level, and severity level "6" represents the least bandwidth. For microwave transport link within an MPLS-based Mobile Backhaul network, the adaptive modulation scheme usually has several levels of adjusted bandwidth, which can be used as the basis for setting the severity level.

If a source LSR of a LSP cannot do anything when the LSP path is impaired, then there is no point in the transit LSR sending any link condition in the echo reply to the sender. Therefore, it is necessary for the sender to indicate if it desires to receive the Downstream Link Condition status in the echo reply. In at least some embodiments, a reserved bit of DS flags in the echo request for the source node can indicate whether the source node desires to receive the impairment condition of the downstream link on a transit LSR. In this scenario, the echo request has the format shown in FIG. 7.

Figure 7:
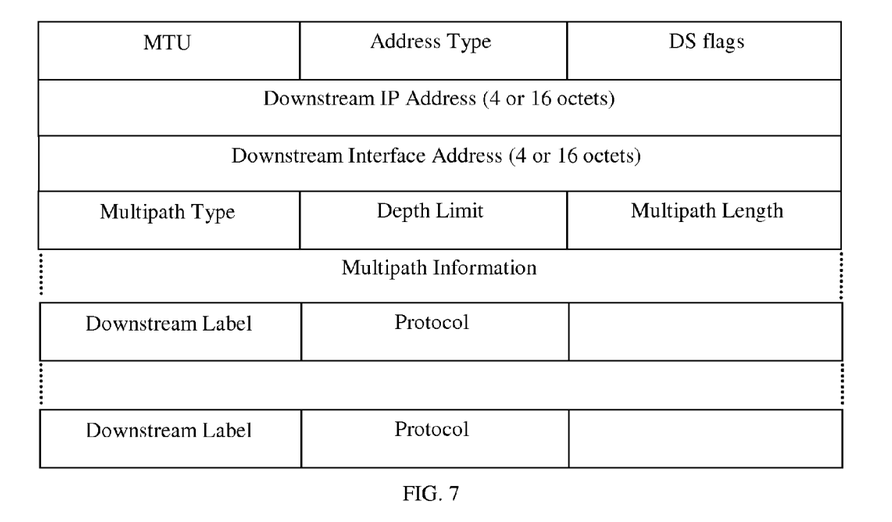
FIG. 7 is a schematic diagram of an embodiment of an echo request.

With regard to the DS flag field of the Echo Request, RFC 4379 already defines the bit "I" and the bit "N" for the octet DS Flags. In at least some embodiments, a new bit (e.g., bit "C") is used to enable the source LSR to indicate if it desires to have the link impairment condition to be reported by a transit LSR in the Echo Reply. In at least some embodiments, the DS flags field has 8 bits, where bits 0-4 are reserved, bit 5 is the "C" bit, bit 6 is the "I" bit, and bit 7 is the "N" bit. When the "C" bit is set to "1," the replying router should include the downstream link condition sub-TLV in the echo reply message. When this flag is not set (C=0), the source LSR does not need downstream path condition information, so the replying router should not include the downstream link condition sub-TLV in the echo reply. If the "C" bit is set, receiving LSRs construct the Downstream Link Condition sub-TLV and insert it into the Echo Reply.

Figure 8:
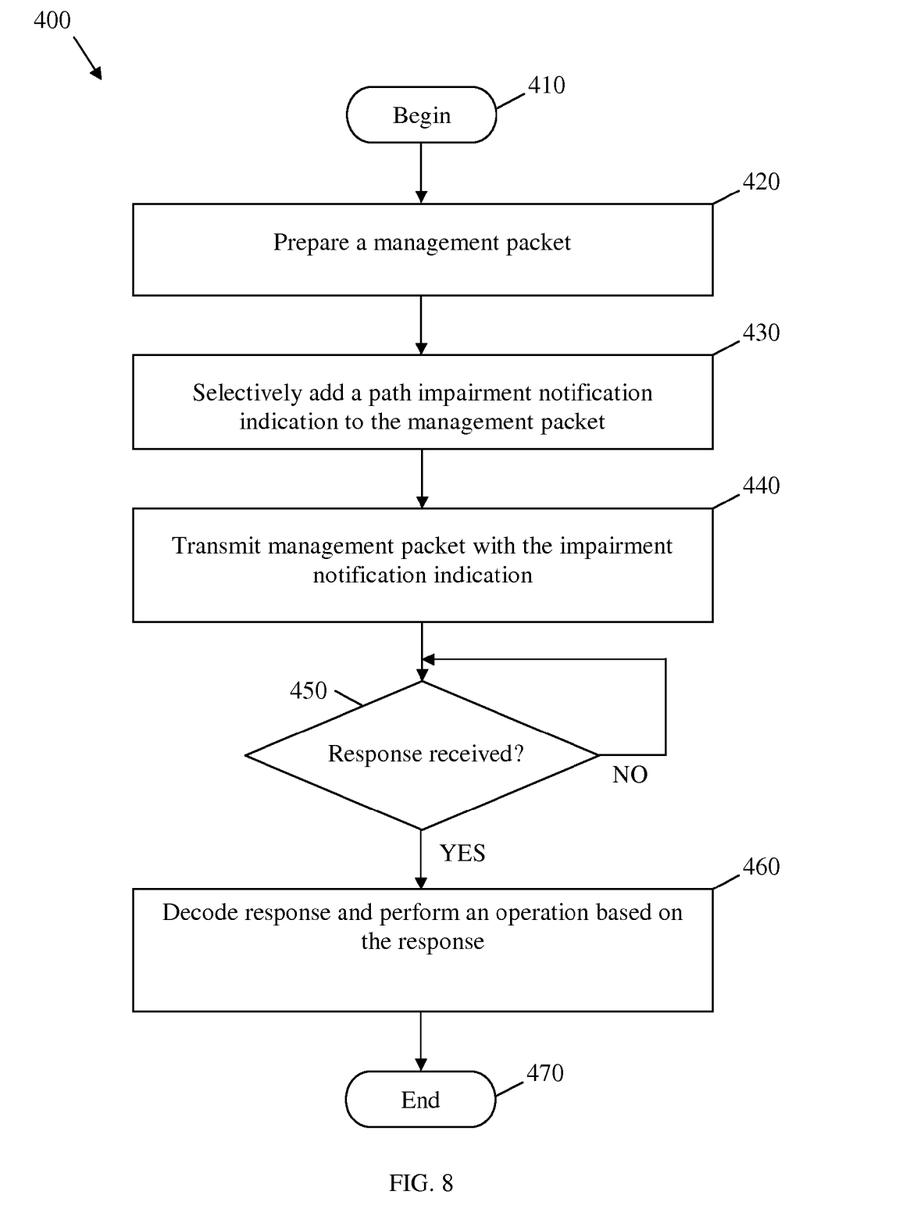
FIG. 8 is a flowchart of an embodiment of a path impairment notification method.

FIG. 8 is a flowchart of an embodiment of a path impairment notification method 400, which may be used as a path impairment notification scheme for a network, such as the service based network 100. The method 400 may be implemented by a network, a network server, the network management plane, one or more nodes in the network, or combinations thereof. The method 400 may begin at block 410, and then a management packet is prepared (block 420). For example, the management packet may be an OAM connectivity frame or a MPLS-Ping TLV frame. A path impairment notification indication is added to the management packet (block 430), and the management packet with the impairment notification indication is transmitted (block 440). The path impairment notification indication may correspond, for example to a sub-TLV for an OAM connectivity frame or for an MPLS-Ping TLV frame. In some embodiments, the path impairment notification indication comprises a multi-bit impairment field that is used to selectively signal at least one of various impairments including, but not limited to, a congested port, a reduced bandwidth, and an altered port. The path impairment notification indication also may include a return address for receipt of responses to the management packet with the impairment notification indication. If a response to the transmitted management packet is not received (block 450), the method 400 waits at block 450. When a response to the transmitted management packet is received (block 450), the response is decoded and an operation is performed based on the response (block 460). In at least some embodiments, the response may add information to the path impairment notification indication and thus decoding the response is facilitated. The operations performed upon receiving the response may include, but are not limited to, initiating a request to obtain additional information regarding an impaired path indicated by the response, changing communication paths to avoid an impaired path indicated by the response, and reducing (but not eliminating) a data load for an impaired path indicated by the response. The method 400 may end at block 470.

Figure 9:
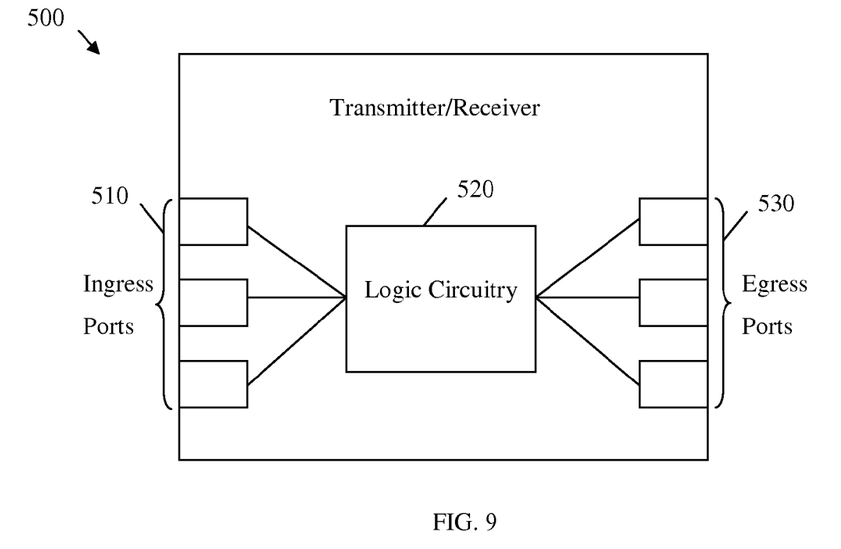
FIG. 9 is a schematic diagram of an embodiment of a transmitter/receiver unit.

FIG. 9 illustrates an embodiment of a transmitter/receiver unit 500, which may be located at or coupled to any of the components described above, e.g. in the service based network 100. The transmitter/receiver unit 500 may be any device that transports data through the network. For instance, the transmitter/receiver unit 500 may correspond to or may be located in any of the nodes 110. As shown, the transmitted/receiver unit 500 may comprise a plurality of ingress ports or units 510 for receiving frames, objects, or type-length-values (TLVs) from other nodes, logic circuitry 520 to determine which nodes to send the frames to, and a plurality of egress ports or units 530 for transmitting frames to the other nodes. The transmitter/receiver unit 500 also may comprise a buffer (not shown) between the ingress ports 510 and the logic circuit 520 and/or between the logic circuit 520 and the egress node 530.

Figure 10:
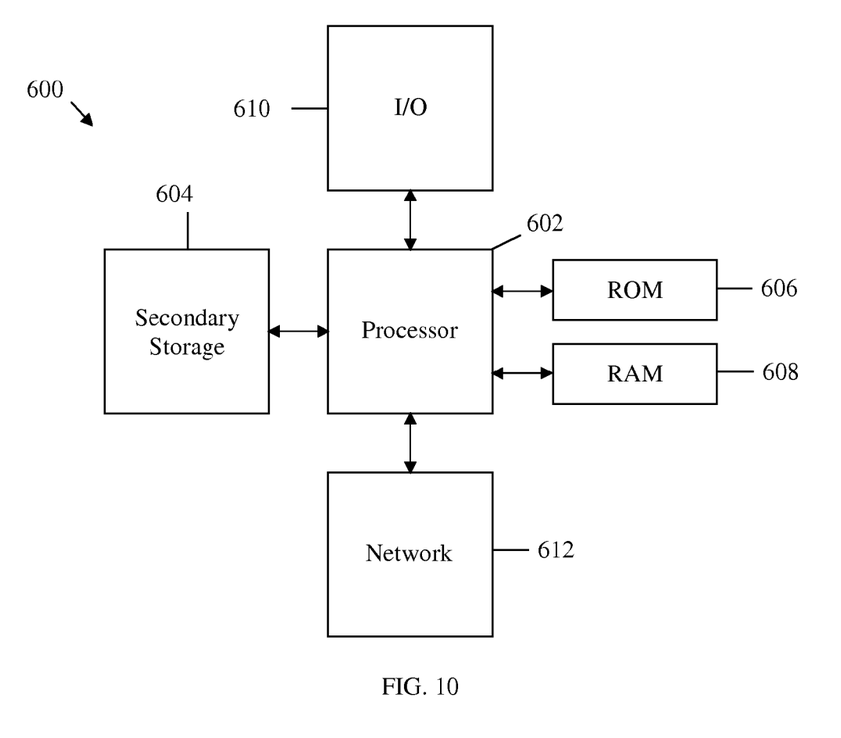
FIG. 10 is a schematic diagram of an embodiment of a general-purpose computer system.

The network components (e.g., the nodes 110) described above may be implemented on any general-purpose network component, such as a computer or network component with sufficient processing power, memory resources, and network throughput capability to handle the necessary workload placed upon it. FIG. 10 illustrates a typical, general-purpose network component 600 suitable for implementing one or more embodiments of the components disclosed herein. The network component 600 includes a processor 602 (which may be referred to as a central processing unit (CPU)) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs) and/or digital signal processors (DSPs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for a source node to manage an impairment condition along a transport path, wherein the method comprises:
    determining whether a traffic managing function can be performed on data designated for the transport path when the impairment condition occurs at a downstream link along the transport path;
    setting a C bit located within a Differentiated Services (DS) flag field of an Echo Request to indicate the source node's desire to receive the impairment condition of the downstream link from a transit node using an Echo Reply; and
    transmitting the Echo Request to the transit node,
    wherein the C bit is set when the traffic managing function can be performed on data designated for the transport path, and
    wherein the DS flag field indicates how the transit node processes the Echo Request.

2. The method of claim 1, wherein the Echo Reply comprises a downstream link condition sub-type-length-value that indicates the impairment condition of the downstream link along the transport path, wherein the downstream link condition sub-type-length-value comprises an impairment type field, and wherein the impairment type field indicates a port towards a downstream node is congested.

3. The method of claim 2, wherein the impairment type field indicates a bandwidth of the link towards the downstream node is reduced.

4. The method of claim 2, wherein the impairment type field indicates a performance of the link towards the downstream node is reduced, wherein the DS flag field further comprises an I bit and a N bit, wherein the I bit indicates an interface and label stack object request, and wherein the N bit indicates to treat the Echo request as a non-Internet Protocol (IP) packet.

5. The method of claim 2, wherein the impairment type field indicates a transport media of the link towards the downstream node has been changed, and wherein the method further comprises receiving the Echo reply before the transport path is in a down state.

6. The method of claim 1, wherein the traffic managing function comprises at least one action selected from a group consisting of: reroute data from the transport path to an alternative path, activate a protection path, and adjust load balancing for the transport path and a second path.

* * * * *